Patented Feb. 13, 1923.

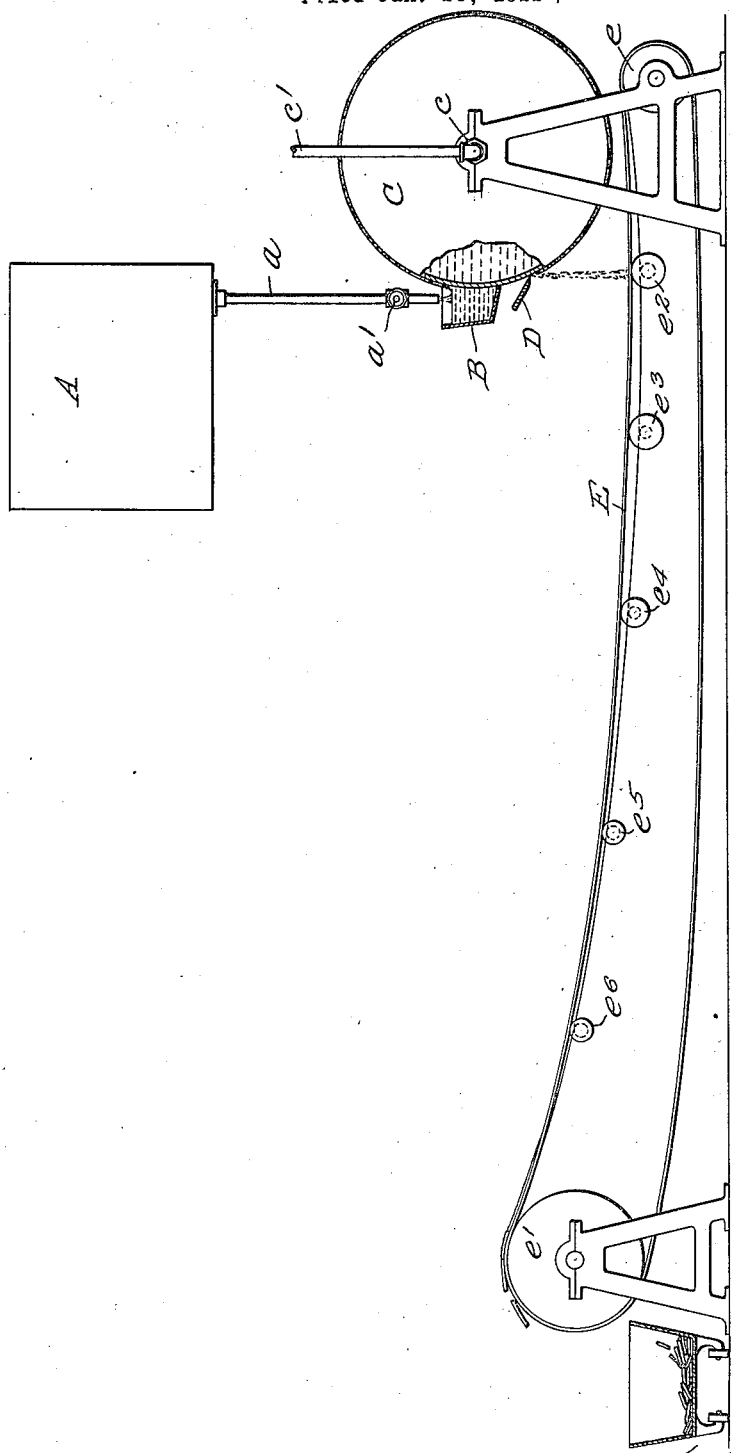

1,445,004

UNITED STATES PATENT OFFICE.

EDWIN COWLES, OF AUBURNDALE, MASSACHUSETTS, ASSIGNOR TO THE ELECTRIC SMELTING & ALUMINUM CO. INC., OF LOCKPORT, NEW YORK.

METHOD OF AND APPARATUS FOR SOLIDIFYING MATERIALS.

Application filed January 26, 1922. Serial No. 531,925.

*To all whom it may concern:*

Be it known that I, EDWIN COWLES, a citizen of the United States, residing at Auburndale, in the county of Middlesex and State of Massachusetts, have invented a new and useful Improvement in Methods of and Apparatus for Solidifying Materials, of which the following is a specification.

This invention relates to methods of and apparatus for causing certain materials to solidify, more particularly to detergent materials of the kind which, during the process of manufacture, change from a liquid or viscous condition to a crystalline condition with an evolution of heat, such materials being for example, described in United States Letters Patent No. 1,419,625 of June 13, 1922, granted to Fay H. Guernsey.

Materials of this kind are combined by boiling the ingredients in a container and the resulting liquid is then permitted to cool, which heretofore has been done in large containers, and after an interval of time the material solidifies with an evolution of heat, due to the crystallizing of the material. Considerable difficulty has heretofore been experienced in the cooling of the material in this manner and in bringing the material to a powdery condition because the materials actually evolve a large amount of heat during crystallization, which requires a long time for cooling the material and which may even elevate the mass to such a high temperature that some of the material in the mass will melt and thus form very hard cakes, which are difficult to grind. In order to bring about the solidifying or crystallizing of the material, agitation is necessary and after the solidifying of the material, it has to be removed from the containers, and this involved considerable labor, owing to the hardness of the solidified material.

The objects of this invention are to provide a method and apparatus for treating material of this kind in such a manner as to greatly expedite the solidifying of the material and to improve the crystallizing thereof so that the resulting material may be easily ground; also to provide a process and apparatus of this kind which will eliminate the work incident to removing the material from the containers; also to improve methods and apparatus of this kind in other respects hereinafter specified.

The accompanying drawing shows more or less diagrammatically, an elevation of an apparatus embodying the invention.

In carrying out the method embodying the invention the various ingredients of the material are combined in the usual manner and after the boiling of the same is completed, the material while in liquid form is spread in a thin layer on a cooling surface or drum. The material is permitted to remain on this surface until the same is quite cool and has reached approximately the consistency of molasses. The material is then scraped from the cooling surface and this scraping action serves not only the purpose of removing the material from the cooling surface, but also agitates all of the material very thoroughly so that the crystallization or solidifying begins shortly after the material has been removed from the cooling surface. The material after being removed from the cooling surface is spread out in a layer, preferably on a traveling belt or conveyor, on which the crystallizing takes place, accompanied by an evolution of heat and a rise in temperature of the material. Since the material is in the form of a layer or sheet during this part of the operation, the heat is readily dissipated, so that the solidifying of the material takes place in much less time than is required when the material is allowed to solidify in a large mass. Furthermore, the belt or conveyor permits the material to crystallize at a higher temperature than that of the viscous material leaving the cooling drum, which results in a better and more uniform crystallization than was heretofore possible and results in a product which can be ground without difficulty. When it is desired to remove the material from the conveyor or other surface, this can be readily done by passing the conveyor over a pulley or otherwise bending the surface on which the material has solidified, so as to cause the material, which is then quite brittle, to break away from this surface and to be discharged therefrom.

This process can be readily carried out by means of the apparatus shown in the drawing, in which A represents a storage tank or reservoir into which the material in liquid form is discharged from the kettles. From this storage tank the liquid is conducted by means of a pipe *a* preferably controlled by means of a valve *a'* into a tank B, one side of which is formed by the cylindrical surface of a cooling drum C. This drum revolves slowly in such a manner that the liquid from the tank B is coated on the periphery of the drum in a thin layer and is cooled by means of a cooling medium within the drum C. The drum may be journalled on any suitable bearing c, and the cooling medium may be conducted to the drum by means of a pipe or conduit c'. This drum preferably revolves quite slowly, for example, approximately three revolutions per minute. The material while in contact with this drum is chilled to a fairly low temperature and becomes approximately of the consistency of molasses when cooled. The material is then removed from the cylindrical surface of the drum by any suitable means, such for example as a scraper D which extends transversely of the drum and scrapes the material therefrom. This scraper has the important function of also acting as an agitator for the material and performs this function very efficiently for the reason that the material acted upon by the scraper is in a thin layer so that all of the material is thoroughly agitated.

As the material is removed from the cooling drum by the scraper, it is preferably deposited upon a traveling conveyor belt E.

In the construction shown, this conveyor is in the form of an endless, flexible belt passing over pulleys e and e', and the material is deposited upon the upper run of the conveyor belt. This run of belt is supported preferably by means of rollers $e^2$, $e^3$, $e^4$, $e^5$, and $e^6$, which in the construction shown are formed with their opposite ends of greater diameter than the intermediate portions thereof, so that the upper run of the belt is supported so as to form a trough for the material, and the conveyor belt is preferably arranged to pass underneath the scraper D. This belt runs very slowly and the agitated material which is deposited thereon crystallizes with an evolution of heat, so that the material carried by the belt may, under certain conditions, be of a higher temperature than that discharged from the cooling drum. By permitting the materials to crystallize at a temperature higher than that of the material leaving the drum C a quick solidification of the thin layer on the belt results, and no excessive heating, such as would hinder the crystallizing action results as would be the case if the material were permitted to solidify in a large mass. The belt preferably operates quite slowly, for example, under certain conditions it has been found that an interval of forty minutes, elapsing from the time that the material is deposited on this belt until the material reaches the pulley e', produces very satisfactory results.

In order to discharge the material, after it has become hard and brittle, from the belt, it is only necessary to cause the belt to run over a pulley or in any other manner to bend the belt. This causes the material to separate from the belt and to drop from the discharge end of the belt in pieces, which can be removed for further treatment, if desired.

The method and apparatus described have the advantages of effecting a great saving in the amount of time required to solidify the material, and also of eliminating the labor heretofore necessary to break the solidified material out of a container. The method and apparatus also have the advantage of producing very uniform results, due probably to the fact that the material is spread out in relatively thin layers and that all the material is subjected to agitation, since the scraper D acts equally upon all particles of the material removed from the cooling drum C. The heat evolved during crystallization is partly dissipated and partly serves to elevate the temperature of the material above that of the viscous liquid, which elevation in temperature is sufficient to expedite the action of crystallization but not sufficient to retard this action by causing some ingredients of the material to be remelted by the heat evolved, as may occur if the material is solidified in a large mass. The apparatus is simple in construction and efficient in operation and requires very little attention while in operation.

I claim as my invention:

1. The hereindescribed method of solidifying materials that solidify at a higher temperature than when in viscous condition, consisting of coating the material while in viscous form on a cooling surface, cooling the material on said surface, removing the material, after the same has been cooled and while still largely viscous, from said cooling surface, and then depositing the material in a layer on a surface on which the same solidifies with an evolution of heat and elevation of temperature while exposed to the cooling action of the air.

2. The hereindescribed method of solidifying materials of the kind described, consisting of coating the material while in liquid form on a cooling surface, removing the material, after the same has been cooled and while still largely viscous, from said cooling surface, then depositing the material in a layer on a surface on which the same solidifies with an evolution of heat and a rising in temperature, and removing the solidified material from said last mentioned surface by bending said surface and thus causing the brittle material to break from said surface.

3. The hereindescribed method of solidifying materials of the kind described, consisting of coating the material while in liquid form on a cooling surface, removing the material, after the same has been cooled and while still largely viscous, from said cooling surface, depositing said material in a layer on a traveling belt on which the material attains a higher temperature and solidifies, and removing the material from said belt by passing said belt around a curved surface.

4. An apparatus for use in solidifying materials of the kind described, including a cooling drum on which the material is deposited while in liquid form, a scraper for removing the material from said drum, a conveyor belt upon which the material discharged from said scraper is deposited and which is of such length as to permit the material to evolve heat and attain a higher temperature while crystallizing, and means for passing said belt around a curved surface to break the solidified material from said belt.

5. An apparatus for use in solidifying materials of the kind described, including a cooling drum on which a relatively thin layer of the material is deposited while in liquid form, means for removing the material from said drum after the material has been cooled and while the same is still viscous, said means for removing the material serving to agitate the material to promote crystallization thereof, a belt upon the upper run of which the material is discharged in a layer from said drum, and which is of such length that the material crystallizes thereon with evolution of heat and a rise in temperature, pulleys over which said belt passes, and rollers supporting said upper run of the belt and which are formed to bend parts of said belt into the form of a trough, said material solidifying on said belt and being broken from said belt when the belt passes over one of said pulleys.

6. An apparatus for use in solidifying materials of the kind described, including a cooling drum on which the material is deposited while in liquid form, a scraper for removing the material from said drum, a surface upon which the material is deposited in a layer from said scraper and on which the material is permitted to remain for a sufficient length of time to enable the same to crystallize with evolution of heat and a rise in temperature, and means for bending said surface after the material has solidified thereon to cause the material to be broken from said surface.

EDWIN COWLES.